US009467600B2

(12) United States Patent
Orbassano

(10) Patent No.: US 9,467,600 B2
(45) Date of Patent: Oct. 11, 2016

(54) DEVICE FOR VIDEO FILMING OF A SUBJECT

(76) Inventor: Marco Orbassano, Borgosesia (IT)

( * ) Notice: Subject to any disclaimer, the term of this patent is extended or adjusted under 35 U.S.C. 154(b) by 244 days.

(21) Appl. No.: 14/233,850

(22) PCT Filed: Aug. 7, 2012

(86) PCT No.: PCT/IB2012/054022
§ 371 (c)(1),
(2), (4) Date: Jan. 20, 2014

(87) PCT Pub. No.: WO2013/021345
PCT Pub. Date: Feb. 14, 2013

(65) Prior Publication Data
US 2014/0139679 A1 May 22, 2014

(30) Foreign Application Priority Data

Aug. 10, 2011 (IT) .............................. MI2011A1525

(51) Int. Cl.
H04N 7/18 (2006.01)
H04N 5/225 (2006.01)
F16M 11/06 (2006.01)
F16M 11/18 (2006.01)
F16M 11/20 (2006.01)
F16M 11/26 (2006.01)
F16M 13/04 (2006.01)
G03B 17/56 (2006.01)

(52) U.S. Cl.
CPC ............ *H04N 5/2251* (2013.01); *F16M 11/06* (2013.01); *F16M 11/18* (2013.01); *F16M 11/2014* (2013.01); *F16M 11/2085* (2013.01); *F16M 11/2092* (2013.01); *F16M 11/26* (2013.01); *F16M 13/04* (2013.01); *G03B 17/561* (2013.01)

(58) Field of Classification Search
USPC .................................................. 386/223–224
See application file for complete search history.

(56) References Cited

U.S. PATENT DOCUMENTS

2007/0160364 A1   7/2007  Peika
2010/0079664 A1*  4/2010  MacKenzie ............ H04N 5/222
                                                                  348/376
2012/0175394 A1   7/2012  Keune

FOREIGN PATENT DOCUMENTS

DE        687 771 C       2/1940
DE   10 2009 049381 A1    4/2011
EP        2 103 862 A2    9/2009

OTHER PUBLICATIONS

Go Pro—creative mounting options—part 2 of 2, Dec. 15, 2010, 14 pages.*
Tscheezy's definitive comprehensive dw-link 5—Spot review, Aug. 22, 2010, 18 pages.*

* cited by examiner

*Primary Examiner* — Hung Dang
(74) *Attorney, Agent, or Firm* — Pearne & Gordon LLP

(57) ABSTRACT

A device (1) for video filming of a subject comprising at least a rod (3), a support (2) for the rod (3), an anchoring element (6) of the support (2) to the subject to be filmed, means (7) for a rotary jointing of the support (2) to the anchoring element (6), a first and at least a second TV camera (4,5) supported by the rod (3) on opposite sides with respect to the rotation axis of the support (2).

18 Claims, 3 Drawing Sheets

DEVICE FOR VIDEO FILMING OF A SUBJECT

The present invention relates to a device and a method for video-filming a subject, in particular but not necessarily for close-up video filming of a subject in rapid evolution.

It is known that is some circumstances it is very complicated, if not impossible, for an operator to manually carry out a close-up filming of a subject in rapid evolution.

This is done in particular in the field of sporting-type manifestations where the athletes in a race are moving on skis, on bicycles or motorcycles or motor cars, on horseback, and so on.

The technical task which the present invention seeks to fulfil is, therefore, that of realising a device and a method for close-up video filming of a subject in rapid evolution.

In the ambit of this technical task, an aim of the invention is to realise a device and a method which enable, simply and practically, close-up video filming of a subject in rapid evolution.

A further aim of the invention is to realise a device and a method which automatically enable, practically without the need for an dedicated operator, close-up filming of a subject in rapid evolution.

The technical task, as well as these and other aims, according to the present invention are attained with a device for video filming of a subject, characterised in that it comprises at least a rod, a support for the rod, an anchoring element of the support to the subject to be filmed, means for a rotary jointing of the support to said anchoring element, a first and at least a second TV camera supported by the rod on opposite side with respect to the rotation axis of the support.

The present invention also relates to a method for video filming of a subject, characterised in that it comprises steps of connecting a rod to a support, the rotary joint of the support to an anchoring element, applying to the rod a first and at least a second TV camera positioned on an opposite side with respect to the rotation axis of the support in such a way as to capture the subject from diametrically-opposite positions, anchoring the anchoring element to the subject to be captured, activating at least a TV camera of the TV cameras, and allowing free 360° rotation of the rod by effect of linear and/or angular accelerations of the subject in order automatically to change at least the field of filming on the subject.

Other characteristics of the present invention are further defined in the subsequent claims. With the device and method for video filming of a subject of the invention, the evolution of a subject can be automatically and accurately filmed in order then to be able to newly enjoy the sensations experienced by the subject in a very realistic way during the course of the film.

Further characteristics and advantages of the invention will emerge more clearly from the description of a preferred but not exclusive embodiment of the device and method, particularly suitable for close-up video filming of a subject in rapid evolution according to the invention, illustrated by way of non-limiting example in the accompanying drawings, in which.

Figure 1:
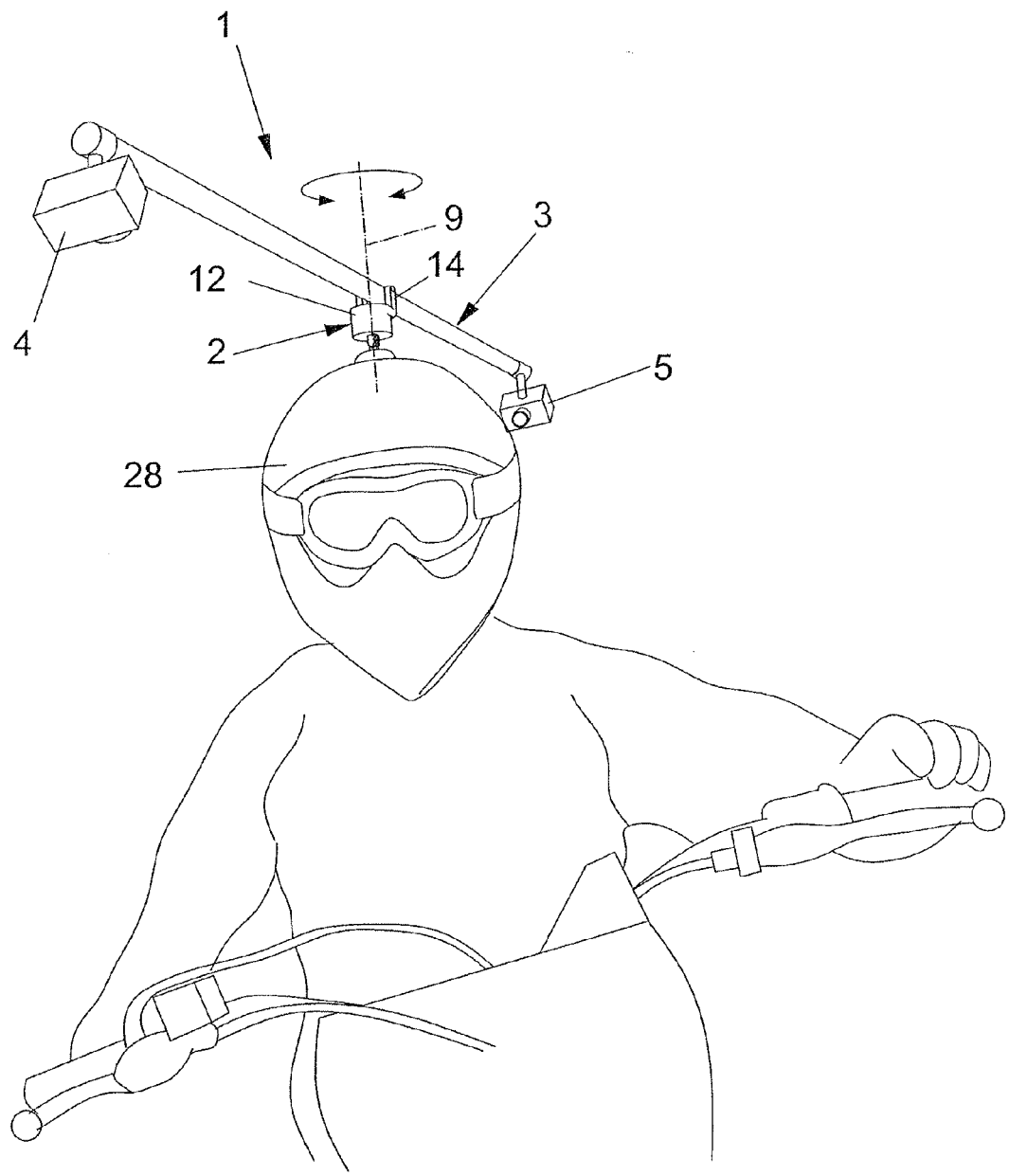
FIG. 1 shows the video filming device applied to a helmet of a motorcyclist.
Figure 2:
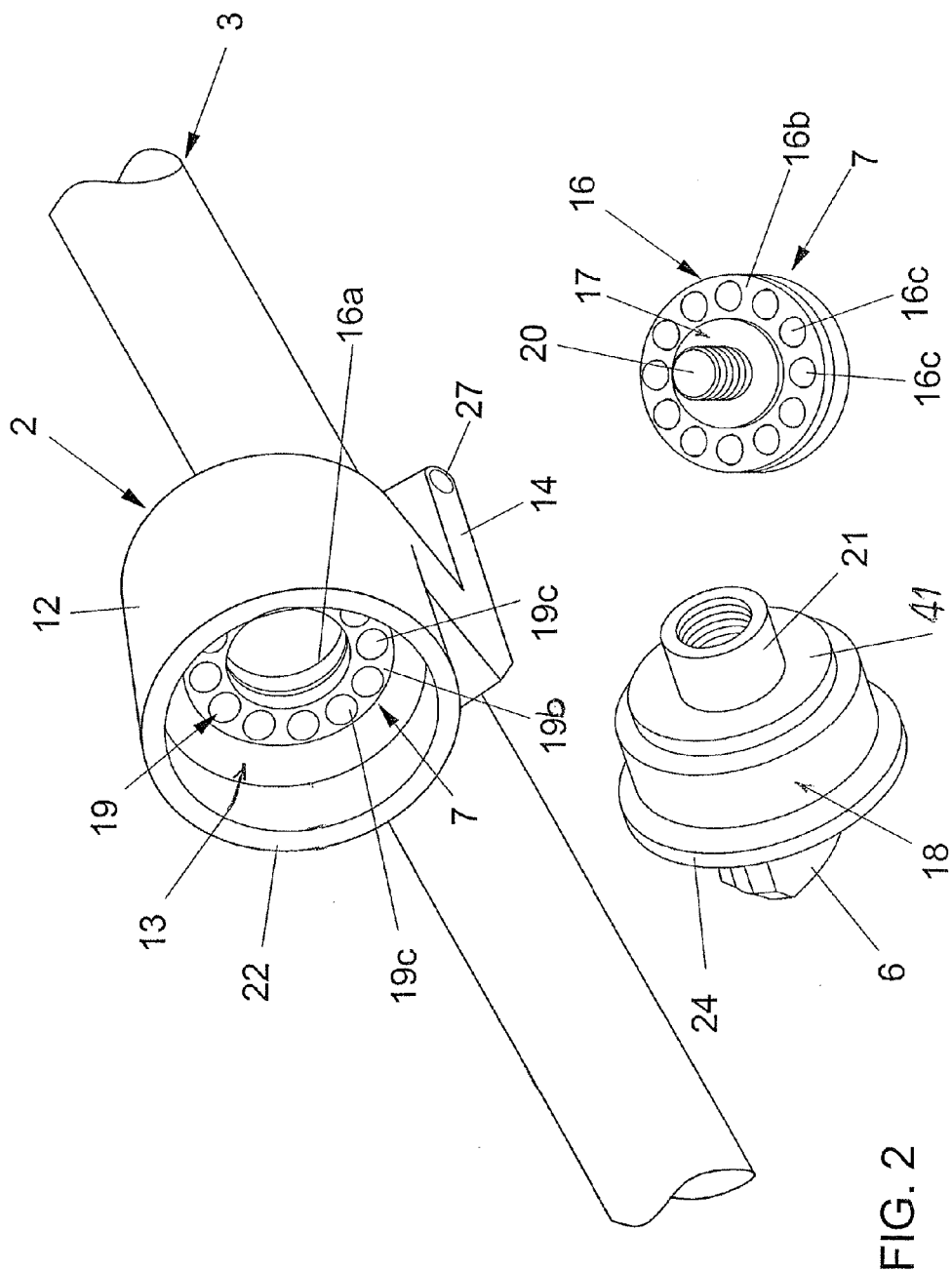
FIG. 2 is an exploded view of the filming device.
Figure 3:
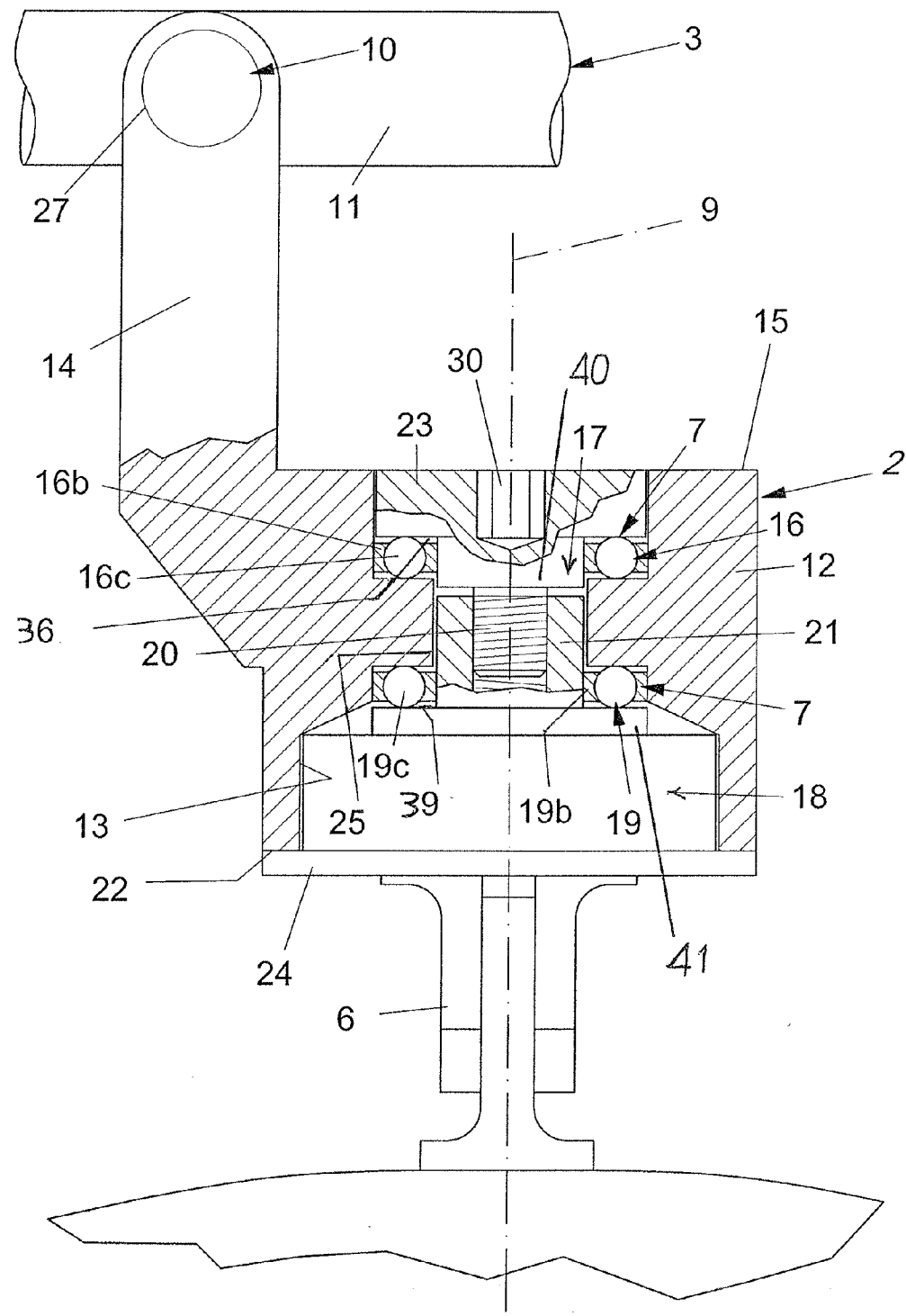
FIG. 3 illustrates a section of the filming device along a plane containing the rotation axis of the support.

With reference to the cited figures, a device is shown for close-up video filming of a subject in rapid evolution, denoted in its entirety by reference numeral 1.

By "subject" is meant, in general terms, a person, animal or an object, or a combination thereof, for example a person in a motor car, on a bicycle, on a motor cycle, on skis, on a snow board, on skates, on horseback, etc.

The video filming device 1 comprises at least a rod, a support for the rod 3, an anchoring element 6 of the support 2 to the subject to be filmed, means 7 for a rotary jointing of the support 2 to the anchoring element 6, a first and at least a second TV camera 4,5 supported by the rod 3 on an opposite side with respect to the rotation axis of the support 3.

More precisely, the rod 3 is supported at an intermediate point 11 thereof by the support.

Means of known type are preferably provided for regulating the angular orientation of the TV cameras 4 and 5 with respect to the rod 3. This regulating, for example of a modular type, enables optimising the selection of the field of the filming on the basis of the subject.

The first TV camera 4 and the second TV camera 5 preferably exhibit a same distance from the intermediate point 11 of the rod 3.

The support 2 is preferably supported freely rotatingly. Alternatively, the rotation of the support 2 can be assisted with a special remote-controlled electric motor.

The support 2 preferably supports the rod 3 with an adjustable angular orientation. This regulation significantly contributes to optimising the choice of the filming field on the basis of the subject.

For adjusting an angular orientation of the rod 3 the support 2 preferably exhibits a pin 10 for rotatingly supporting the rod 3 transversal to the rotation axis 9 of the support 2 defined by the rotary jointing means 7. The angular position of the rod 3 with respect to the support pin 2, once adjusted, can be blocked with blocking means of known type. The support pin 10 is offset from the rotation axis 9 of the support 2 as it transversally crosses the rod 3 at the intermediate point 11 thereof.

Adjusting means of the distance between the TV cameras 4 and 5 are preferably provided. This adjustment can also contribute to the optimisation of the framed field of vision.

This can be attained by means of known type which position the TV cameras 4 and 5 adjustably along the rod 3, or for example by providing a rod 3 having a telescopic structure. The position of the TV cameras 4 and 5 can also be adjusted such that they exhibit a different distance from the intermediate point 11 of the rod 3.

The support 2 preferably comprises a longitudinal body 12 having, in a longitudinal direction, a cavity 13 and a wing 14 solidly constrained to the body 12, which body 12 develops laterally to the prolongation of a first end 15 of the body 12.

The rotating pin 10 is supported in a hole 27 present at the end of the wing 14.

The rotary jointing means 7 preferably comprise a first joint element 7) which rotatably and coaxially engages in said cavity 13 by means of a first axial-thrust ball bearing 16, and a second joint element 18, solidly constrained to the first joint element 17, which rotatably and coaxially engages in said cavity 13 by means of a second axial-thrust ball bearing 19, coaxially housed in the cavity 13.

The axial rotation of the assembly formed by the fist joint element 17 and the second joint element 18 is guided by cylindrical surfaces for laterally delimiting the cavity 13 on which lateral cylindrical surfaces of the first joint element 17 and the second joint element 18 slidably engage. In the intermediate position, the cavity 13 exhibits an annular abutment 25 which prevents axial extraction of the assembly formed by the first joint element 17 and the second joint element 18 and separates a first region of the cavity 13 between the abutment 25 and the first end 15 of the body 12 in which the first joint element 17 is positioned from a second region of the cavity 13 between the abutment 25 and the second end 22 of the body 12 in which the second joint element 18 is positioned.

In particular, the first bearing 16 comprises a ring 16b and spheres 16c and is interposed between the side of the abutment 25 facing towards the first end 15 of the body 12 and an annular abutment 36 present on the first element 17.

The second bearing 19 comprises a ring 19b and spheres 19c and is instead interposed between the side of the abutment 25 facing towards the second end 22 of the body 12 and an annular abutment 39 present on the second element 18.

The first joint element 17 and the second joint element 18 are solidly constrained by a screw engagement between a threaded stem 20 borne coaxially fixed by the first joint element 17 and an internally-threaded bush 21 borne coaxially fixed by the second joint element 18. The abutment 36 is defined between two coaxial cylindrical portions 23, 40 having different diameters of the first joint element 17, while the abutment 39 is defined between a cylindrical portion 41 and the bush 21 of the second joint element 18 to which the cylindrical portion 41 is coaxial.

In particular the ring 16b of the first bearing 16 rings the cylindrical portion 40, while the ring 19b of the second bearing 19 rings the bush 21.

At the base thereof facing towards the outside of the cavity 13, the second joint element 18 exhibits a circular flange 24 which completely covers the end of the cavity 13 which opens at the second end 22 of the body 2.

The anchoring element 6, of any known type, is provided on the base of the second element 18 facing towards the outside of the cavity 13.

The anchoring element 6 is solidly constrained to the second joint element 18 and can be fixed to or made in a single piece there-with.

A socket 30 is present on the base of the first joint element 17, facing towards the end 15 of the body 12, which socket 30 is for engaging a screwing tool of the first joint element 17 to the second joint element 18.

The method for close-up video filming of a subject in rapid evolution is briefly as follows.

After having assembled the device 1 the anchoring element 6 is anchored to the subject to be filmed.

In the illustrated case, for example, the anchoring element 6 is anchored to any system of known type at the top of a motorcyclist's helmet 28.

Before filming, and according to the subject to be filmed, the specific adjustments are made and, for example, the angle of filming of the TV cameras 4, 5 are fixed, as well as the position and the distance between the TV cameras 4 and 5, and the angle between the rod 3 and the support 2.

The TV cameras 4 and 5 specially pointed towards the subject to be filmed are activated preferably though not necessarily contemporaneously.

In particular, as the rod 3 is rectilinear, the TV cameras film the subject from diametrically opposite placings such as to guarantee complete visualisation of everything that happens to the evolving subject.

Also in order to guarantee complete visualising of everything that happens to the evolving subject, the support 2 and consequently also the rod 3 are able to perform a rotation of 360° with respect to the axis 9.

During filming the rod 3 rotates by effect of the linear and/or angular accelerations of the subjects in rapid evolution to automatically change the filming frame on the subject.

The offsetting between the point 11 in which the rod 32 is supported by the support 2 and the rotation axis 9 of the support 2 enables not having a continuous rotation of the support 2 which is set in rotation especially when the rod 3 is subjected to a centripetal acceleration.

Modifications and variants, apart from those which have already been mentioned, are naturally possible, so that, for example the filming device of the invention can be anchored on a horse's back or on a car roof, or in other places besides.

The specific structure and configuration of the support 2, the rotary joint means 7 and the anchoring element 6 can also be very different from what has been illustrated herein above.

For example, the support 2 can be a rotating magnetic plate, especially in a case in which it is to be fixed to a roof of a car.

The device and method for video-filming a subject as conceived herein are susceptible to numerous modifications and variants, all falling within the scope of the inventive concept; further, all details can be replaced by technically-equivalent elements.

In practice the materials used, as well as the dimensions thereof, may be any according to requirements and the state of the art.

The invention claimed is:

1. A device for video filming of a subject comprising at least a rod, a support for the rod, an anchoring element of the support to the subject to be filmed, means for a rotary jointing of the support to said anchoring element, a first TV camera supported by the rod on a side with respect to the rotation axis of the support,
    wherein said support comprises a longitudinal body having, in a longitudinal direction, a cavity, said means for a rotary jointing of said support to said anchoring element comprise a first joint element which rotatably and coaxially engages in said cavity by means of a first axial thrust ball bearing, and a second joint element which rotatably and coaxially engages in said cavity by means of a second axial-thrust ball bearing, said first and said second joint elements exhibiting a reciprocal screw-fastening, said cavity exhibiting an abutment for preventing axial exiting from the cavity of the group comprising said first and second joint elements.

2. The device for video filming of a subject according to claim 1, wherein said support is supported freely rotationally.

3. The device for video filming of a subject according to claim 1, wherein said support is rotatable by 360° with respect to the rotation axis thereof.

4. The device for video filming of a subject according to claim 1, wherein said rod is supported in an offset position to the rotation axis of the support.

5. The device for video filming of a subject according to claim 1, wherein said support supports the rod with an adjustable angular orientation.

6. The device for video filming of a subject according to claim 1, wherein said rod is straight.

7. The device of claim 1, comprising at least a second TV camera, the first and the second TV camera being supported by the rod on an opposite side with respect to the rotation axis of the support.

8. The device for video filming of a subject according to claim 1, wherein means are provided for regulating the angular orientation of the TV camera with respect to the rod.

9. The device for video filming of a subject according to claim 8, wherein for regulating the angular orientation of the rod, the support exhibits a support pin for rotationally supporting the transversal rod which support pin is offset from the rotation axis of the support.

10. The device for video filming of a subject according to claim 1, wherein means are provided for regulating a distance between said first and at least a second TV camera.

11. The device for video filming of a subject according to claim 10, characterised in that said rod is telescopic.

12. The device for video filming of a subject according to claim 1, wherein said anchoring element is borne by said second joint element and is positioned at the second end of said body.

13. The device for video filming of a subject according to claim 12, wherein the external base of said first joint element exhibits a socket for engaging a screw-fastening tool of the first joint element to the second joint element.

14. A device for video filming of a subject comprising:
at least a rod,
a support for the rod,
an anchoring element of the support to the subject to be filmed,
a rotary joint for the support to said anchoring element,
a first TV camera supported by the rod on a side with respect to a rotation axis of the support,
wherein means are provided for regulating the angular orientation of the rod with respect to the support for the rod along an axis transversal to the rotation axis, for regulating the angular orientation of the rod, the support exhibits a support pin for rotationally supporting the rod,
wherein said support is supported freely rotationally and rotatable by 360° with respect to the rotation axis thereof and comprises a longitudinal body having, in a longitudinal direction, a cavity, and a wing solidly constrained to the body, the wing developing laterally to a prolongation of a first end of the body and exhibiting said support pin at an end thereof,
wherein said rotary joint for said support comprises a first joint element which rotatably and coaxially engages in said cavity by means of a first axial thrust ball bearing, and a second joint element which rotatably and coaxially engages in said cavity by means of a second axial-thrust ball bearing, said first and said second joint elements exhibiting a reciprocal screw-fastening, said cavity exhibiting an abutment for preventing axial exiting from the cavity of the group comprising said first and second joint elements.

15. The device for video filming of a subject according to claim 14, wherein said rod is straight.

16. The device of claim 14, comprising at least a second TV camera, the first and the second TV camera being supported by the rod on an opposite side with respect to the rotation axis of the support.

17. The device of claim 14, wherein said support comprises a longitudinal body having, in a longitudinal direction, a cavity, and a wing solidly constrained to the body, the wing developing along the direction of the rotation axis and exhibiting said support pin at an end thereof.

18. The device of claim 17, wherein the wing develops laterally to a prolongation of a first end of the body and said support pin is offset from the rotation axis of the support.

* * * * *